(No Model.)
W. L. THOMPSON.
Process of Desulphurizing Ores.
No. 242,397. Patented May 31, 1881.
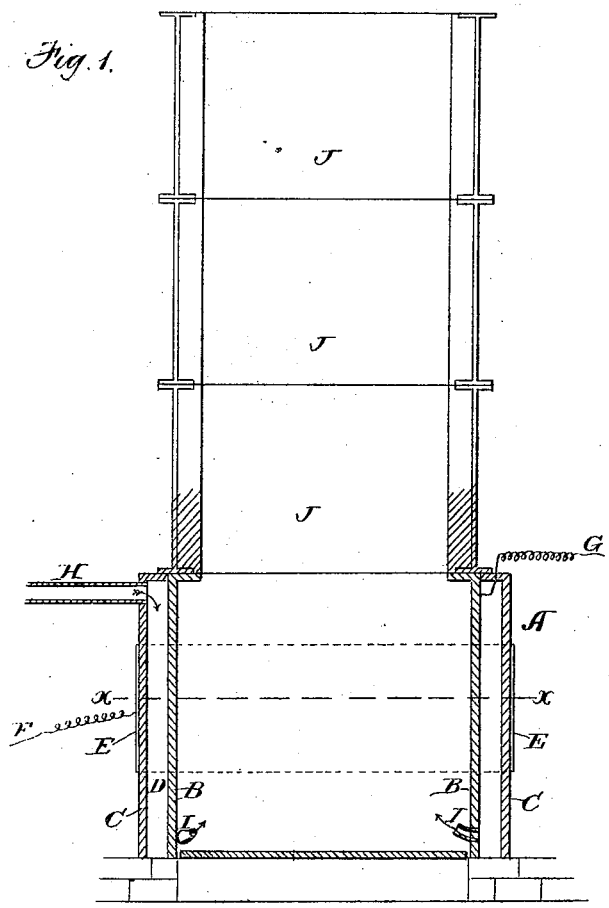
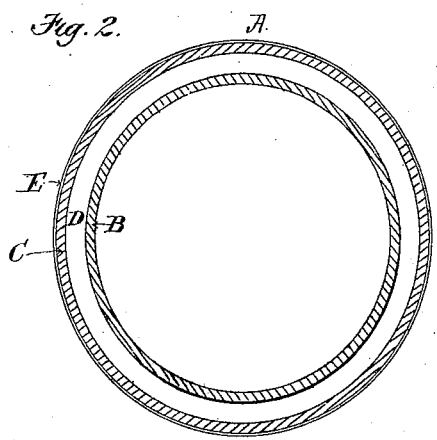
Witnesses.
H. G. Wadling
W. J. Stockton
Inventor
W. L. Thompson.
by Wright & Brown
Attys

UNITED STATES PATENT OFFICE.

WILLIAM L. THOMPSON, OF BOSTON, MASSACHUSETTS.

PROCESS OF DESULPHURIZING ORES.

SPECIFICATION forming part of Letters Patent No. 242,397, dated May 31, 1881.

Application filed June 5, 1880. (No model.)

*To all whom it may concern:*

Be it known that I, WILLIAM L. THOMPSON, of Boston, in the county of Suffolk and State of Massachusetts, have invented certain Improvements in Process of Desulphurizing Ores, of which the following is a specification.

This invention relates to the preparation of sulphide ores for the process of extracting from them their gold and silver by amalgamation or other known means of extraction.

It is well known that the usual roasting or oxidation to which sulphide ores are subjected prior to the amalgamating process cannot entirely remove the sulphur, a small proportion of free sulphur and sulphides always remaining, which are extremely detrimental to the amalgamating process, because they sicken the mercury, and thus cause its loss, as well as that of the precious metals sought by the mercury. The usual roasting process is also inadequate to completely oxidize and remove the base metals from the ores, such metals being objectionable, because they alloy with the mercury, causing the latter to flow or divide into fine particles, which are lost, or, if not lost, the mercury in this form becomes sluggish and inactive.

My invention has for its object to entirely remove all traces of free sulphur, sulphides, and base metals from roasted sulphide ores prior to the amalgamating process; and to this end it consists in subjecting them to a blast of ozone or ozonized air, which is passed through the ores after they have been roasted and then allowed to cool, so that their temperature will not destroy the ozone, which is destroyed by a temperature of about 300° centigrade. I have discovered that ozone used in this way will remove the sulphur and sulphides and complete the oxidation of the base metals, leaving the ores in the best condition for mercurial or other extraction.

In carrying out my invention I combine in any suitable way a receptacle or holder for the roasted and cooled ores, a generator for ozone, and an air-forcing apparatus to force air through the ozone-generator and into the ore-receptacle. The ozone may be produced by several methods—for instance, by the slow oxidation of phosphorus, as in Mayer's apparatus. The most practical means at present known for producing ozone appears to be the silent discharge of electricity in air. For this purpose electricity of considerable tension is required, best obtained by the Ruhmkorff coil, or the induction-machines like those of Holtz, Varley, Carré, Chester, and the like. The best form of ozone-generator is that of Andrews, described in Roscoe & Schorlemmer's Treatise on Chemistry, Vol. 1, p. 196, consisting, essentially, of a non-conducting shell with a conducting-core and a conducting insulated surface outside of the shell. The inner core is connected with one pole of the coil or induction-machine, and the outer conducting-surface is connected with the other pole. Air is passed between the shell and its core, and when the source of tension electricity is in operation the air becomes strongly charged with ozone.

The accompanying drawings show an adaptation of the Andrews ozone-generator to my present invention. Figure 1 of said drawings represents a vertical section of the ozone-generator and the ore-holder; and Fig. 2 represents a transverse section on line $x\,x$, Fig. 1.

A represents the ozone-generator, consisting of a cylindrical conducting-core, B, of iron, and a non-conducting shell, C, which should be of glass or other non-conductor of electricity and surround the core B, being separated from the latter by an annular space, D.

E represents the conducting-surface on the outer periphery of the shell C, said surface being tin-foil or any suitable metal insulated by the shell C.

F represents a wire connecting the surface E with one pole of a Ruhmkorff coil or induction-machine, and G a wire connecting the core B with the other pole.

H represents an induction-pipe, through which air is forced into the annular space D by a suitable blower, and I I represent tuyeres or pipes to conduct the air after it has become ozonized into the ore-holder.

In the present instance the core B forms the wall of a portion of the ore-holder, said core being the support for a cylindrical ore-roasting furnace built up in sections J J J, the ozone-generator and furnace being practically one and the same structure. When the apparatus is made in this form care must be taken to keep the zone of combustion high enough above the ozone-generator to insure the proper cooling of the ore by the time it descends to the neighborhood of the tuyeres I, and, if desired, the cooling of the ore may be facilitated by a blast of steam introduced into it below the zone of combustion.

The zone of combustion may be kept above the ozone-producer by allowing a sufficient quantity of roasted and cooled ore to remain in the lower part of the furnace—that is to say, the lower part of the furnace is always kept so full of roasted ore that the zone of combustion, which is necessarily above the roasted ore, is far enough from the base or point where the ozone enters to prevent the destruction of the ozone or its chamber or generator by heat. If necessary, steam may be injected into the roasted ore to cool it, as stated.

In this apparatus the blast of air is utilized to promote combustion after the ozone has done its work in the cooled ore. I do not limit myself, however, to any particular form of apparatus, nor to any relative arrangement of the ozone-generator and the ore-holder. If desired, the two may be made in entirely distinct structures communicating through a pipe for the conveyance of the ozone from the generator to the holder.

It has heretofore been proposed in the extraction of the precious metals from their ores to pulverize and wet such ores, and then subject them to the action of ozone, the ore being held in a cone, which cone is in communication with a water-jacket and an ozone-generator.

Having thus described my invention, what I claim is—

The process of completing the desulphurization and oxidation of sulphide ores, the same consisting in roasting such ores, next cooling the same, and finally subjecting such roasted and cooled ores to the action of ozone or ozonized air, substantially as specified.

In testimony whereof I have signed my name to this specification, in the presence of two subscribing witnesses, this 3d day of June, 1880.

WILLIAM L. THOMPSON.

Witnesses:
H. G. WADLIN,
C. F. BROWN.